United States Patent [19]

Sell et al.

[11] Patent Number: 4,989,393
[45] Date of Patent: Feb. 5, 1991

[54] MACHINE FOR SEALING CUPS WITH FILM

[75] Inventors: Frank E. Sell, Janesville, Wis.; John H. Adams, Rockford, Ill.

[73] Assignee: Rutherford Engineering, Inc., Roscoe, Ill.

[21] Appl. No.: 455,561

[22] Filed: Dec. 22, 1989

[51] Int. Cl.⁵ .......................... B65B 7/28; B26D 5/08
[52] U.S. Cl. ........................................ 53/299; 53/296; 53/329; 83/554
[58] Field of Search ............... 53/282, 290, 296, 297, 53/299, 329, 348, 361, 373, 559, 298; 83/554

[56] References Cited

U.S. PATENT DOCUMENTS

| | | | |
|---|---|---|---|
| 3,354,604 | 11/1967 | Amberg et al. | 53/329 X |
| 3,587,372 | 6/1971 | Prew | 83/554 X |
| 3,712,023 | 1/1973 | Bryan, Jr. et al. | 53/282 X |
| 3,792,567 | 2/1974 | Balcome | 53/329 |
| 3,838,550 | 10/1974 | Mueller | 53/329 |
| 3,927,506 | 12/1975 | Abd-Alla | 53/297 X |
| 4,176,507 | 12/1979 | Mancini | 53/329 X |

Primary Examiner—Robert L. Spruill
Assistant Examiner—Beth Bianca
Attorney, Agent, or Firm—Leydig, Voit & Mayer

[57] ABSTRACT

A web of heat-sealable film is advanced in overlying relation with filled cups to a sealing station where both the web and the cups dwell momentarily. During the dwell period, sealing heads advance downwardly and seal the web to the upper end portions of the cups. The heads are advanced downwardly with a two-step stroke, the heads first advancing in unison with a carriage and then being individually advanced by individual pneumatic actuators which are mounted on the carriage. After being sealed, the cups are indexed to a cutting station where annular knives are advanced downwardly to cut through the web and leave each cup with a circular sealing membrane. The knives are advanced with a two-step stroke similar to that of the sealing head.

6 Claims, 4 Drawing Sheets

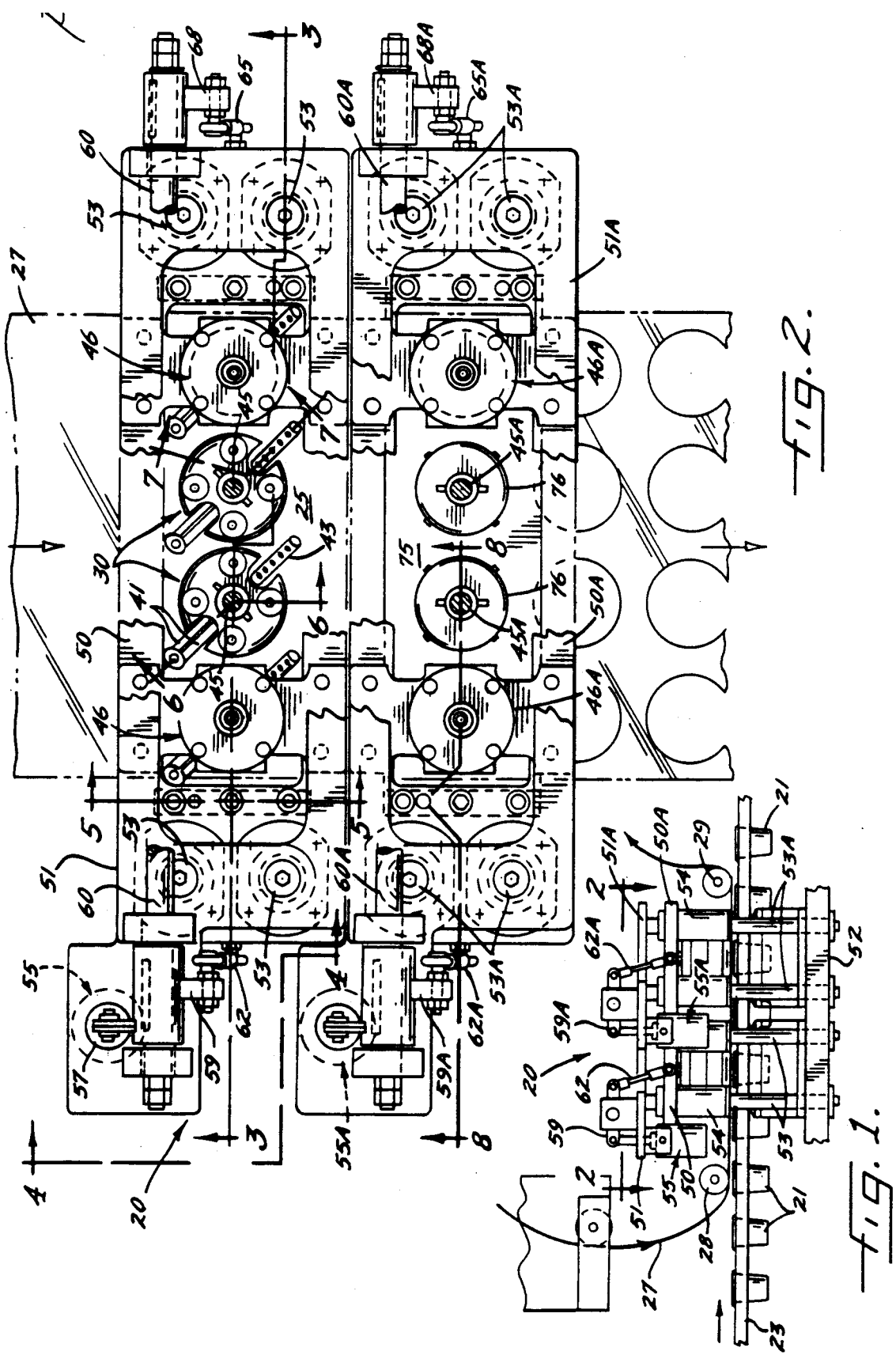

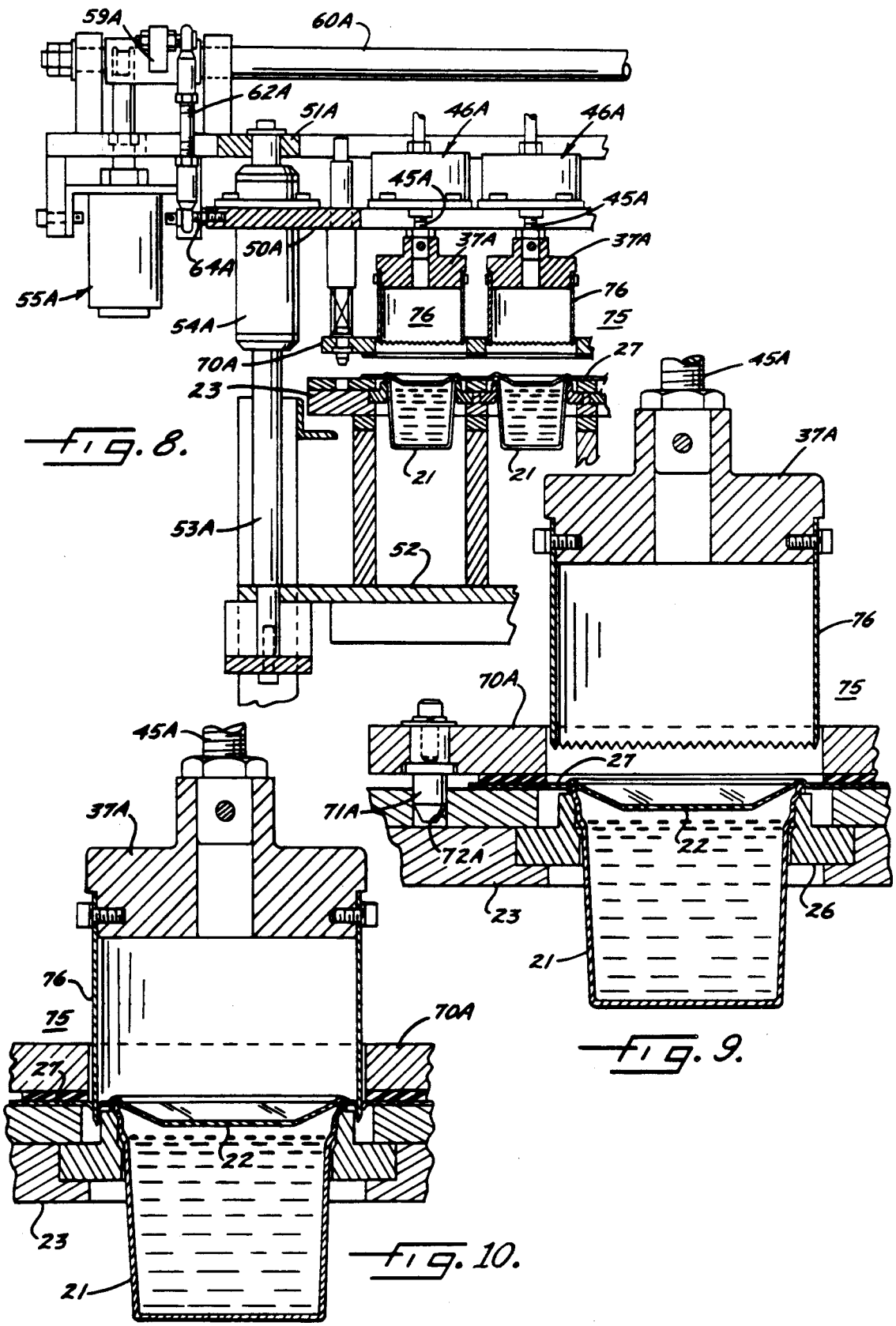

MACHINE FOR SEALING CUPS WITH FILM

BACKGROUND OF THE INVENTION

This invention relates to a machine for sealing the upper ends of cups filled with a product such as a food product. The cups may, for example, be of the type used to hold yogurt, cottage cheese, sour cream, snack dips or the like.

A machine of this general type is disclosed in Shaw et al U.S. Pat. No. 4,736,568. In that machine, a web of heat-sealable material is advanced in overlying relation with a row of filled cups to a sealing station where both the web and a cup dwell momentarily. During the dwell period, a head at the sealing station advances downwardly and successively tamps a disc-like portion of the web downwardly into the upper end portion of the cup, seals the outer periphery of the disc-like portion to and around the upper lip of the cup and then severs the disc-like portion from the web so as to leave the cup sealed with a flexible membrane.

The Shaw et al patent contemplates that a plurality of individual sealing heads may be located at the sealing station and may be simultaneously operated in order to effect sealing of a group of cups at the same time. Each sealing head includes an individual actuator and each is moved downwardly through its full stroke whenever the actuator is operated.

SUMMARY OF THE INVENTION

The general aim of the present invention is to provide a new and improved machine of the above type which, when compared to prior machines, is subjected to less shock and wear during operation and experiences a longer service life.

A more detailed object is to achieve the foregoing by providing a machine in which several sealing heads are mounted on a common carriage and are first advanced in unison with the carriage into close proximity with the cups and then are individually advanced during the final sealing. The two-step stroke of the sealing operation reduces sudden impacts and reduces wear of the machine.

A further object is to perform the sealing and cutting operations at separate stations and to actuate a cutting mechanism in substantially the same manner as the sealing mechanism.

These and other objects and advantages of the invention will become more apparent from the following detailed description when taken in conjunction with the accompanying drawings.

BRIEF DESCRIPTION OF THE DRAWINGS

FIG. 1 is a somewhat schematic side elevational view of a new and improved machine incorporating the unique features of the present invention.

FIG. 2 is an enlarged top plan view of the machine as seen along the line 2—2 of FIG. 1, certain parts of the machine being broken away and shown in section.

FIGS. 3, 4, 5, 6, 7 and 8 are fragmentary cross-sections taken substantially along the lines 3—3, 4—4, 5—5, 6—6, 7—7 and 8—8, respectively, of FIG. 2.

FIGS. 9 and 10 are enlarged views of certain parts illustrated in FIG. 8 and show one of the cutters in successively moved positions.

DETAILED DESCRIPTION OF THE PREFERRED EMBODIMENT

Figure 3:
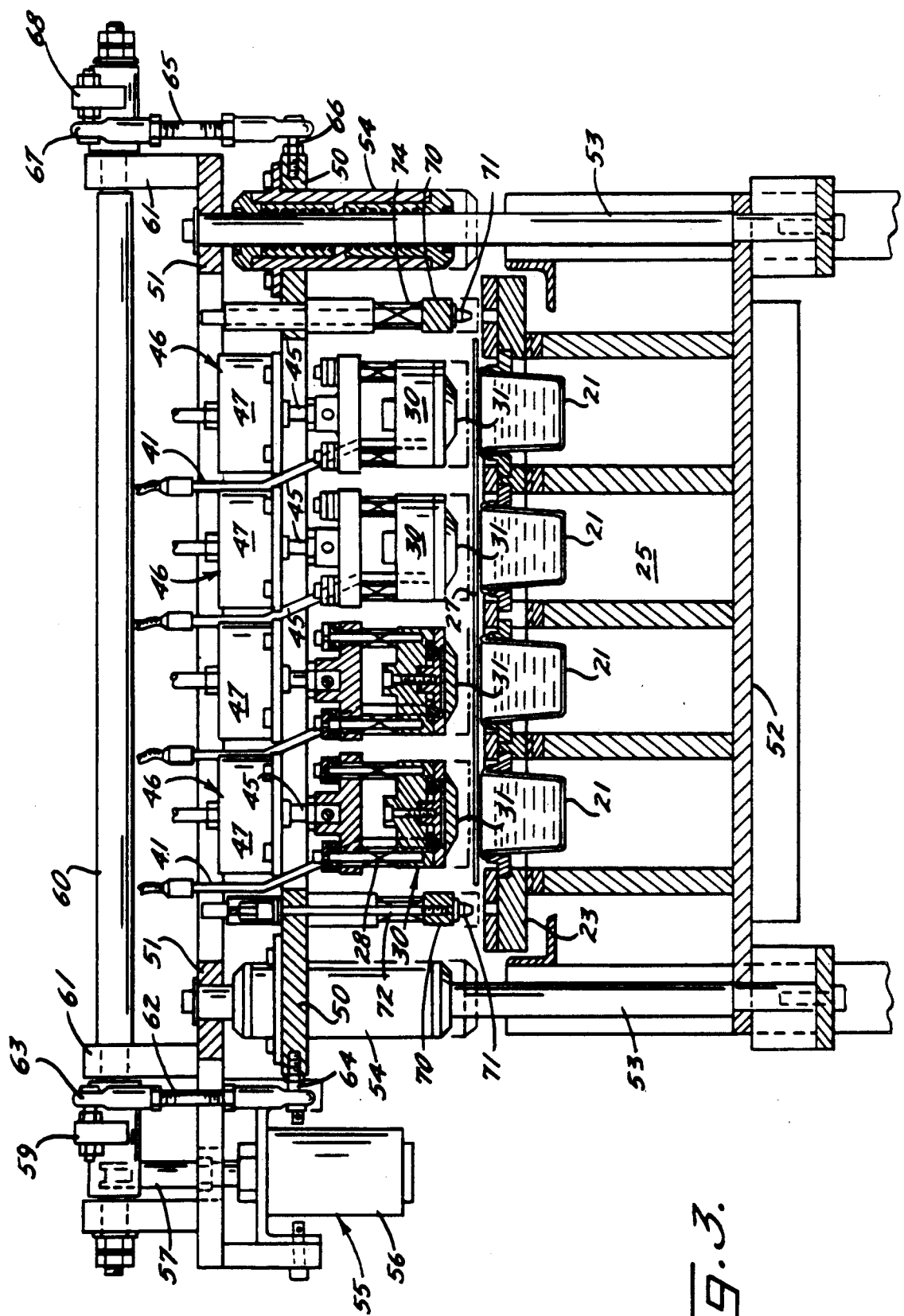

For purposes of illustration, the machine 20 of the present invention is shown in the drawings in conjunction with cups 21 of the type used to hold yogurt or the like. Each cup is vacuum-formed from styrene or other plastic-like material and includes a gradually tapered body of circular cross-section.

The machine 20 operates to tamp a sealing membrane 22 (FIG. 6) downwardly into the upper end portion of each cup 21 and to seal the membrane to the cup around the lip thereof after the cup has been filled with product and before a lid is applied to the cup. The membrane seals in freshness and provides a tamper-evident means to enable a consumer to determine whether the cup has been opened prior to purchase.

More specifically, the machine 20 includes a power-driven endless conveyor 23 adapted to advance rows of four laterally spaced cups 21 step-by-step along a predetermined path through a sealing station 25. The cups are telescoped into adaptor rings 26 (FIG. 6) which are carried by the conveyor.

An elongated web 27 of heat-sealable film is advanced step-by-step above the conveyor 23 and through the sealing station 25 in overlying relation with the filled cups 21. During each dwell period, disc-like portions of the web are pushed downwardly into the upper end portions of the four cups dwelling in the sealing station and are sealed to the cups around the lips thereof. The web is dispensed from a supply roll (not shown), passes beneath an idler roll 28 (FIG. 1) to the sealing station, passes under another idler roll 29 downstream of the sealing station, and then is wound onto a power-driven take-up roll (not shown). When the web dwells, it is in a relatively slack state in the sealing station. Reference may be made to Shaw et al U.S. Pat. No. 4,736,568 for a more detailed disclosure of a typical web feeding system.

The machine 20 includes four laterally spaced heads 30 adapted to be advanced downwardly in order to seal the web to the four cups 21 which dwell in the sealing station 25. Herein, each sealing head includes a generally frusto conical lower mandrel 31 (FIG. 6) made of firm rubber and having a diameter just slightly smaller than the inner diameter of the upper end portion of the cup. Overlying the mandrel and secured thereto by screws 32 is a sealing shoe 33 whose lower end is formed with a downwardly opening groove 34 (FIG. 7) extending circumferentially around the peripheral portion of the shoe. The groove is generally complementary in shape to the shape of the lip of the cup and is adapted to receive the lip when the head 30 is advanced downwardly.

Figure 6:
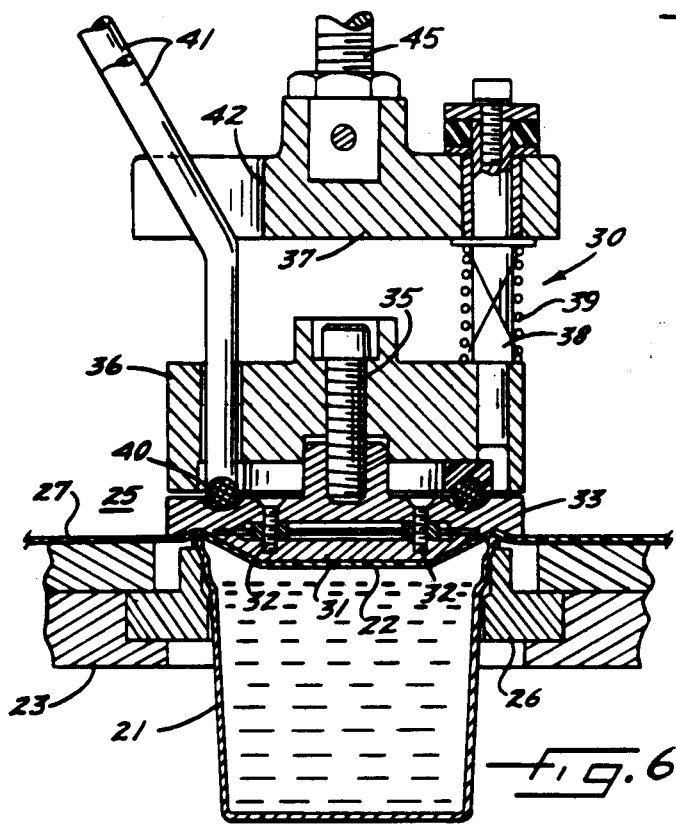
Figure 7:
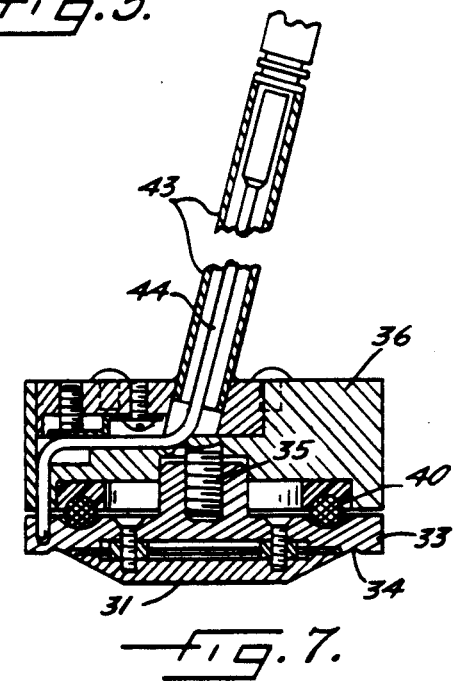

As shown in FIG. 6, the shoe 33 of each head 30 is secured by a screw 35 to an overlying collar 36. The collar is spaced downwardly from a block 37 and is secured thereto by four angularly spaced rods 38 which extend slidably through the block. Coil springs 39 encircle the rods and are compressed between the block and the collar in order to urge the collar and the shoe 33 downwardly away from the block. The springs and the rods allow continued downward movement of the block 37 after downward movement of the shoe 33 and the collar 36 has been stopped.

Secured rigidly to the upper side of each sealing shoe 33 is an electric heating element 40 (FIG. 6) in the shape of a ring and adapted to heat the shoe when energized by voltage applied to conductors (not visible). The conductors are housed within tubes 41 which are received with sliding clearance in a notch 42 in the periphery of the block 37. A thermocouple housing 43 (FIG. 7) extends through another notch in the block 37 and contains a thermocouple 44 for signaling the temperature of the shoe.

In operation of the machine 20 as described thus far, a group of four cups 21 dwells at the sealing station 25 and, at the same time, the web 27 dwells above the cups. During the dwell period, the sealing heads 30 are advanced downwardly. The mandrel 31 of each head engages a circular portion of the web and tamps the web downwardly into the cup. Shortly thereafter, the sealing shoe 33 clamps the web against the lip of the cup and seals the web to the cup.

In accordance with the present invention, the sealing heads 30 are advanced downwardly in a two-step stroke. First, the heads move downwardly in unison until the heads are in close proximity to the cups 21 and are just short of their full travel. Thereafter, the heads are individually advanced downwardly until the sealing shoes 33 are stopped by the lips of the cups. Such a two-step stroke quickly brings the sealing heads into proximity with the cups but enables the final motion to be closely controlled so as to reduce shock and promote longevity of the machine 20.

More specifically, the block 37 of each sealing head 30 is attached to the lower end of the rod 45 (FIGS. 3 and 6) of a reciprocating pneumatic actuator 46 having a cylinder 47. The rod advances downwardly out of the cylinder when the upper end of the cylinder is pressurized and is retracted upwardly when the lower end of the cylinder is pressurized.

In keeping with the invention, the actuators 46 for the four sealing heads 30 are commonly supported by a carriage 50 (FIG. 3) which herein is in the form of a flat plate. The carriage 50 is mounted to move upwardly and downwardly on a main support or frame having upper and lower frame members 51 and 52 which are tied together by four vertically extending rods 53. Ball bushings 54 on the carriage support the carriage to move upwardly and downwardly on the rods.

Upward and downward movement of the carriage 50 is effected by a reciprocating fluid-operated actuator 55 (FIG. 4) having a cylinder 56 connected to the lower side of the upper frame member 51. A rod 57 extends upwardly from the cylinder and is pivotally connected at 58 to one end of a lever 59 whose midportion is fast on a shaft 60, the shaft extending parallel to the carriage and being journaled by bearings 61 on the upper frame member. The upper end of a link 62 is pivotally connected at 63 to the other end of the lever 59 while the lower end of the link is pivotally connected at 64 to one end of the carriage 50. The lower end of a second link 65 (FIG. 3) is pivotally connected at 66 to the opposite end of the carriage and, at its upper end, the link 65 is pivotally connected at 67 to a crank arm 68 which is rigid with the shaft 60.

Figure 4:
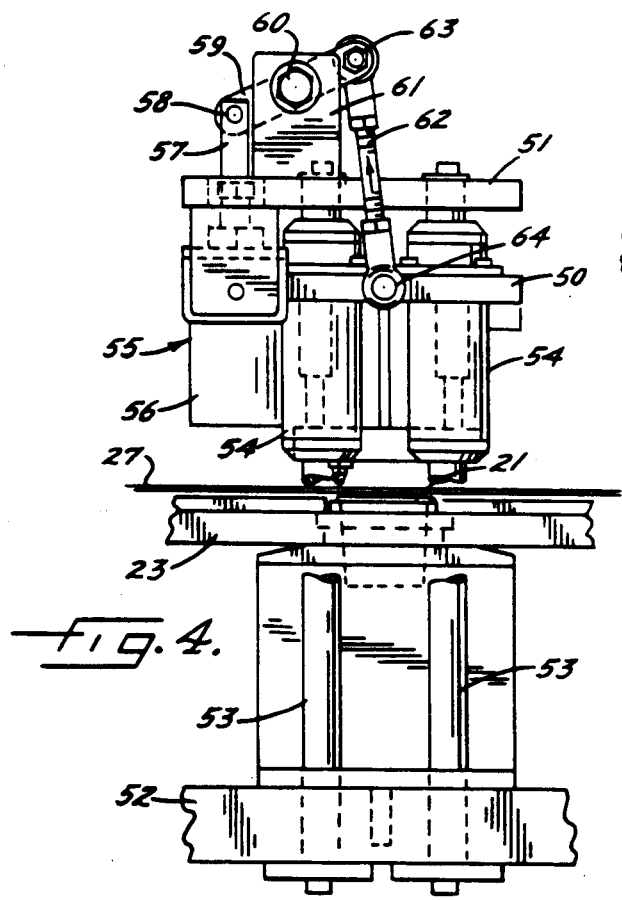

During advance of the cups 21 and the web 27, the sealing heads 30 are located in retracted positions and are spaced upwardly from the web as shown in solid lines in FIG. 3. During the dwell period, the lower end of the cylinder 55 is pressurized to force the rod 57 upwardly. The rod acts through the lever 59 and the link 62 to move the carriage 50 downwardly along the rods 53.

Because the cylinders 47 of the actuators 46 of all four sealing heads 30 are mounted on the carriage 50, all four heads move downwardly in unison when the carriage is shifted downwardly by the actuator 55. Downward movement of the carriage is stopped when the grooves 34 of the sealing shoes 33 are approximately ⅛" above the lips of the cups 21. The carriage may be stopped by positive stops or, in the present instance, by virtue of the rod 57 moving through its full stroke in the cylinder 56.

Once the carriage 50 has stopped, the actuators 46 are individually operated by pressurizing the upper ends of the cylinders 47. As a result, the rods 45 are advanced downwardly to cause the sealing shoes 33 to move through the additional ⅛" or so of travel necessary to press the web 27 against and seal the web to the upper ends of the cups 21. The actuators 46 have a stroke of only about ¼" and thus final movement of the sealing shoes is very controlled with little shock being applied to either the machine or the cups. Once the sealing shoes 33 have stopped against the cups, the springs 39 yield to permit the blocks 37 to move downwardly relative to the stopped shoes as the rods 45 complete their downward strokes. Thereafter, the lower ends of the cylinders 47 and the upper end of the cylinder 56 are pressurized to retract the rods 45 and 57 and the carriage 50 and thereby lift the sealing heads 30 from the cups before the cups are advanced out of the sealing station 25.

Figure 5:
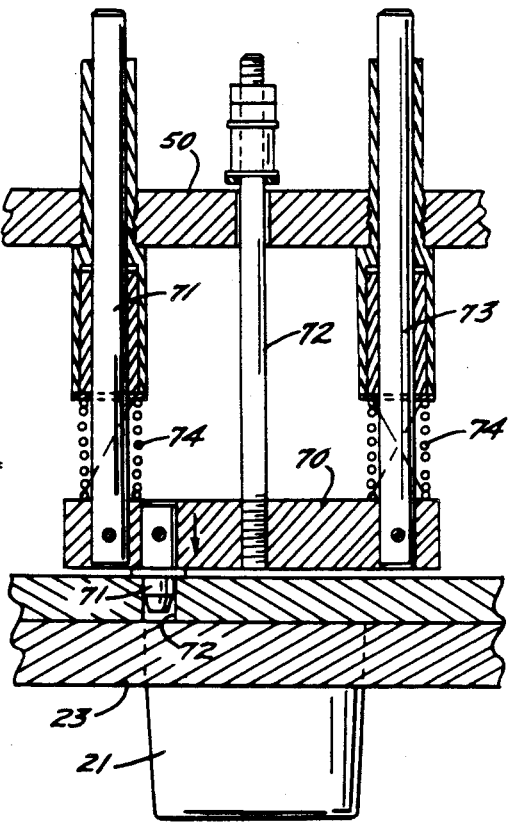

The carriage 50 is fixtured rigidly in its lowered position in order to insure accurate centering of the sealing shoes 33 relative to the cups 21. For this purpose, platens 70 (FIGS. 3 and 5) are disposed beneath each end of the carriage 50 and each platen carries a depending locator pin 71. As the carriage nears the end of its downward stroke, the locator pins dowel closely into holes 72 formed in the conveyor 23. As a result, the carriage and the conveyor are held against relative movement so as to insure centering of the sealing shoes 33 with respect to the cups. Each platen 70 is supported on the lower ends of rods 71, 72 and 73 (FIG. 5) which are guided for up and down sliding by the carriage 50. Coil springs 74 are telescoped over the rods 71 and 73 and urge the platen downwardly while permitting the carriage to complete its downward stroke after the platen has been stopped by the conveyor.

When the sealing operation has been completed, the cups 21 are indexed downstream to a cutting station 75 which is located immediately adjacent the sealing station 25. At the cutting station, a group of four laterally spaced knives 76 cut disc-like portions from the web 27 and thereby leave the circular sealing membranes 22 at the tops of the cups. Each knife is annular and is carried on the lower end of a block 37A (FIGS. 8 to 10) which, in turn, is connected to the lower end of the rod 45A of a pneumatic actuator 46A. The latter is mounted on a carriage 50A (FIG. 8) adapted to be moved upwardly and downwardly on rods 53A by an actuator 55A which acts through a lever 59A and a link 62A. Other components in the cutting station 75 corresponding to those in the sealing station 25 have been indicated by reference numerals with an "A" suffix designator.

When the actuator 55A is operated, the carriage 50A with all four actuators 46A is moved downwardly until the knives 76 are located about ⅛" above the cups 21 as shown in FIG. 9. Thereafter, the actuators 46A are operated to cause the knives to move downwardly through and cut the web 27 and thereby leave circular sealing membranes 22 on the cups 21. Each of the actuators has a stroke of ⅜" to insure that the knife travels through the web. Upon completion of the cutting stroke, the actuators 46A and the actuator 55A are reversed to retract the knives and permit indexing of the cups.

We claim:

1. A machine for applying and sealing heat-sealable film to the open upper ends of filled cups, said machine comprising, in combination, a conveyor for intermittently advancing said cups step-by-step along a predetermined path through a sealing station and for causing successive groups of cups to dwell momentarily in the sealing station, advancing an elongated web of film step-by-step through said sealing station in upwardly spaced relation with the cups being advanced therethrough and for causing said web to dwell each time a group of cups dwells in said sealing station, and mechanism for forcing said web downwardly toward the upper end portions of each group of cups dwelling in the sealing station and for sealing a portion of said web to the upper end of each such cup, said mechanism comprising a main support, a carriage mounted to move upwardly and downwardly on said support, a group of heated sealing heads corresponding in number to the number of cups which dwell as a group in said sealing station, said heads being mounted on said carriage to move upwardly and downwardly in unison with said carriage and also being supported to move upwardly and downwardly relative to said carriage, means for moving said carriage downwardly each time a group of cups dwells in said sealing station thereby to shift said heads downwardly into proximity with such cups, means for thereafter shifting said heads downwardly relative to said carriage to cause said heads to force portions of said web against and seal such portions to the upper end portions of the cups in the sealing station, and means for retracting said heads upwardly before the cups in the sealing station are advanced out of such station.

2. A machine as defined in claim 1 in which said means for moving said carriage comprise a reciprocating fluid-operated actuator having a cylinder connected to said support and having a rod projecting upwardly from said cylinder, a lever pivotally mounted on said support and having one end portion pivotally connected to said rod, and a link pivotally connected between said carriage and the other end portion of said lever.

3. A machine as defined in claim 1 in which said means for shifting said heads comprise a group of reciprocating fluid-operated actuators, there being one actuator for each of said heads, each of said actuators having a cylinder connected to said carriage and having a rod connected to the respective head.

4. A machine as defined in claim 1 in which said conveyor also intermittently advances said cups through a cutting station downstream of said sealing station and causes successive groups of cups to dwell momentarily in said cutting station, and mechanism for cutting through said web outwardly of the upper end portion of each cup dwelling in said cutting station, said cutting mechanism comprising a second carriage mounted to move upwardly and downwardly on said support, a group of annular knives corresponding in number to the number of cups which dwell in said cutting station, said knives being mounted on said second carriage to move upwardly and downwardly in unison with said second carriage and also being supported to move upwardly and downwardly relative to said second carriage, means for moving said second carriage downwardly each time a group of cups dwells in said cutting station thereby to shift said knives downwardly into proximity with such cups, means for thereafter shifting said knives downwardly relative to said second carriage to cause each knife to cut through said web around the upper end portion of each cup dwelling in the cutting station, and means for retracting said knives upwardly before the cups in the cutting station are advanced out of such station.

5. A machine for applying heat-sealable film to the open upper ends of filled cups, said machine comprising, in combination, a conveyor for intermittently advancing said cups step-by-step along a predetermined path through a sealing station and then through a cutting station and for causing successive groups of cups to dwell momentarily in each station, means for advancing an elongated web of said film step-by-step above said cups and for causing said web to dwell each time said cups dwell, means for forcing said web downwardly toward each group of cups dwelling in said sealing station and for sealing a portion of said web to the upper end of each such cup, and mechanism for cutting through said web outwardly of the upper end portion of each cup dwelling in said cutting station, said mechanism comprising a main support, a carriage mounted to move upwardly and downwardly on said support, a group of annular knives corresponding in number to the number of cups which dwell in said cutting station, said knives being mounted on said carriage to move upwardly and downwardly in unison with said carriage and also being supported to move upwardly and downwardly relative to said carriage, means for moving said carriage downwardly each time a group of cups dwells in said cutting station thereby to shift said knives downwardly into proximity with such cups, means for thereafter shifting said knives downwardly relative to said carriage to cause each knife to cut through said web around the upper end portion of each cup dwelling in the cutting station, and means for retracting said knives upwardly before the cups in the cutting station are advanced out of such station.

6. A machine as defined in claim 5 in which said forcing and sealing means comprise a second carriage mounted to move upwardly and downwardly on said support, a group of heated sealing heads corresponding in number to the number of cups which dwell as a group in the sealing station, said heads being mounted on said second carriage to move upwardly and downwardly in unison with said second carriage and also being supported to move upwardly and downwardly relative to said second carriage, means for moving said second carriage downwardly each time a group of cups dwells in said sealing station thereby to shift said heads downwardly into proximity with such cups, means for thereafter shifting said heads downwardly relative to said second carriage to cause said heads to force portions of said web against and seal such portions to the upper end portions of the cups in the sealing station, and means for retracting said heads upwardly before the cups in the sealing station are advanced out of such station.

* * * * *